United States Patent [19]

Roberts et al.

[11] Patent Number: 4,553,634
[45] Date of Patent: Nov. 19, 1985

[54] TREE STAND

[76] Inventors: Manuel E. Roberts, 4309 Westlawn Dr., Nashville, Tenn. 37209; Thomas W. Ketchum, Hannah Ford Rd., Pegram, Tenn. 37143

[21] Appl. No.: 705,784
[22] Filed: Feb. 26, 1985
[51] Int. Cl.⁴ .......................... A47C 9/10; A45F 3/26; A01M 31/02
[52] U.S. Cl. .................................. 182/134; 182/187
[58] Field of Search ............... 182/187, 188, 134, 135; 108/152

[56] References Cited

U.S. PATENT DOCUMENTS

| | | | |
|---|---|---|---|
| 3,340,828 | 9/1967 | Smith | 182/187 |
| 3,460,649 | 8/1969 | Baker | 182/187 |
| 3,664,460 | 5/1972 | Zdroit | 182/187 |
| 3,991,853 | 11/1976 | Bridges | 182/187 |
| 4,022,292 | 5/1977 | Van Gompel | 182/187 |
| 4,130,180 | 12/1978 | Ferguson | 182/187 |
| 4,137,995 | 2/1979 | Fonte | 182/187 |
| 4,316,526 | 2/1982 | Amacker | 182/187 |
| 4,428,459 | 1/1984 | Peck | 182/187 |
| 4,458,782 | 7/1984 | Meyer | 182/187 |

Primary Examiner—Reinaldo P. Machado
Attorney, Agent, or Firm—Harrington A. Lackey

[57] ABSTRACT

A tree stand having a platform, preferably separated in a front-to-rear dimension to form a pair of side-by-side hinged platform sections for swinging movement between an operative coplanar position and an inoperative collapsed position, a pair of opposed side supporting arms pivotally mounted to the side edges of the platform and projecting upward and rearward in an operative position for straddling a tree against which the rear edge of the platform is mounted, and a cross bar connectable to the rear ends of the supporting arms behind the tree for securing the tree stand to the tree trunk in operative position. The support arms are pivotally connected to the side edge portions of the platform in such a manner that they may be swung between the operative position and an inoperative position in which the support arms are colinear with the side edges of the platform member, so that the tree stand may be folded to a compact position for transport on the back of the operator.

14 Claims, 10 Drawing Figures

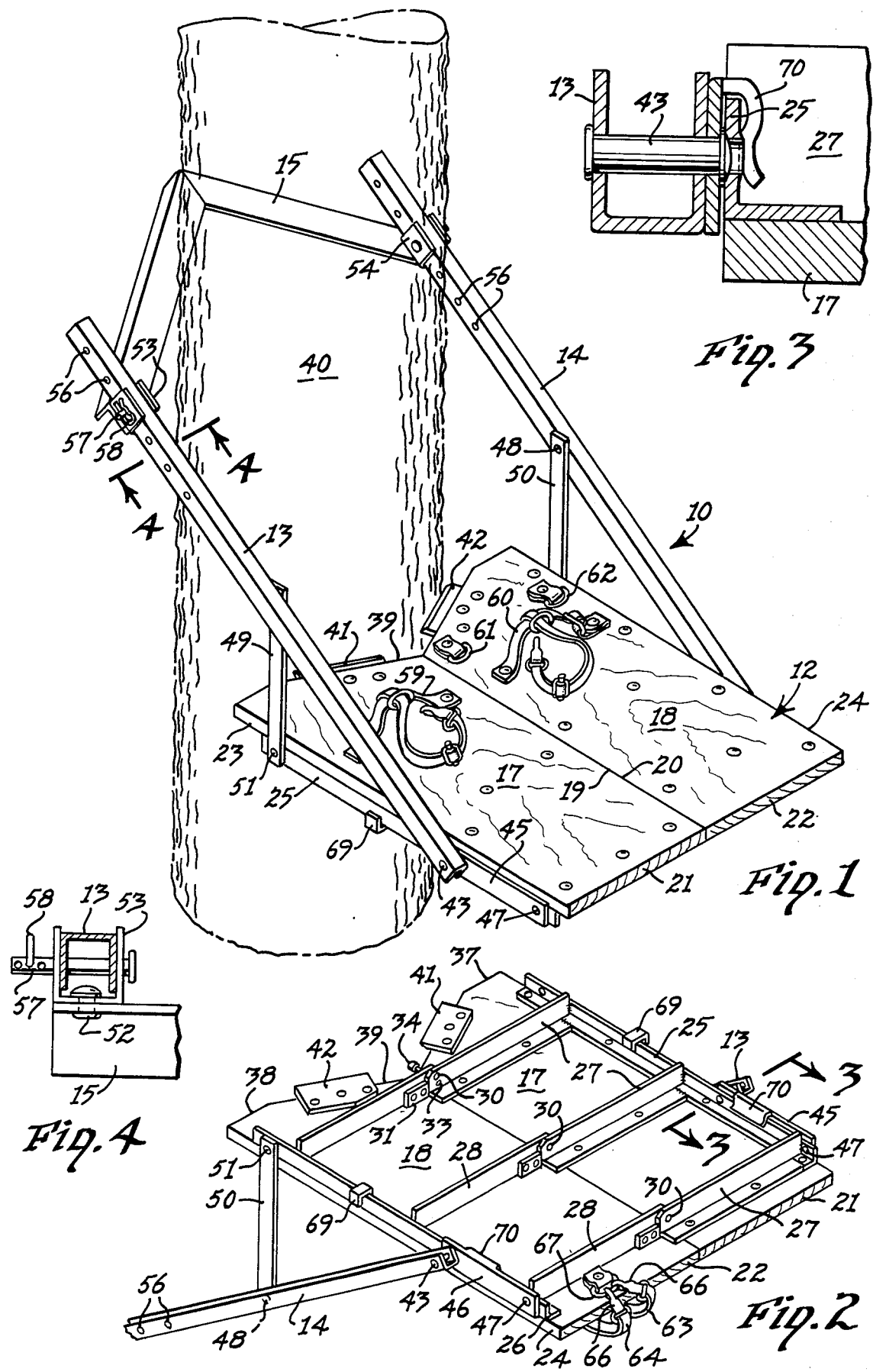

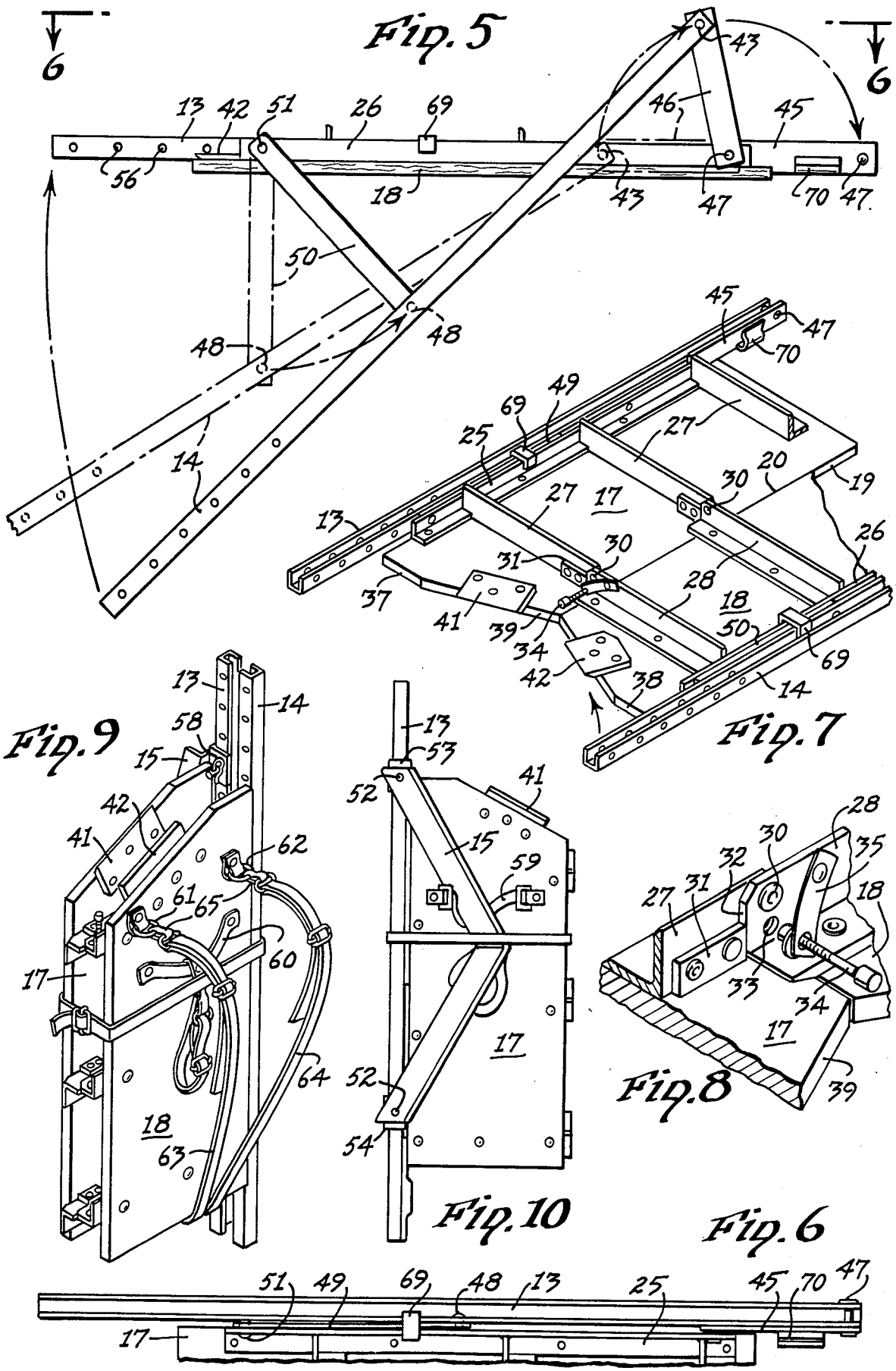

TREE STAND

BACKGROUND OF THE INVENTION

This invention relates to a tree stand, and more particularly to a collapsible, portable tree stand.

Tree stands and tree climbing platforms are well known in the art, as illustrated in the following U.S. patents:

| | | |
|---|---|---|
| 3,340,828 | Smith et al | Sep. 12, 1967 |
| 3,460,649 | Baker et al | Aug. 12, 1969 |
| 3,664,460 | Zdroik | May 23, 1972 |
| 3,991,853 | Bridges | Nov. 16, 1976 |
| 4,022,292 | VanGompel | May 10, 1977 |
| 4,137,995 | Fonte | Feb. 6, 1979 |
| 4,428,459 | Peck | Jan. 31, 1984 |

The Baker U.S. Pat. No. 3,460,649 discloses a well-known, commercially available, tree climbing-hunting platform having a platform with a rear edge adapted to engage the front side of a tree trunk, and supporting arms mounted on the sides of the platform and inclined upward and rearward past the tree trunk to support a cross bar, or V-bar behind the trunk in order to support the platform in an elevated position upon the tree trunk.

The Smith et al U.S. Pat. No., 3,340,828 discloses a tree-mounted seat for folding to a collapsed position.

The Zdroik patent discloses a tree seat having hinged, collapsible seat sections.

The VanGompel and Peck patents disclose tree stands having pivotally mounted support arms, which are also made collapsible by slideably mounted connections. The Chenoweth U.S. Pat. No. 2,285,901, issued June 9, 1942, discloses a material handling scaffold divided longitudinally into a pair of collapsible sections which are hinged together.

None of the above patents disclose a tree stand of the type disclosed in the Baker U.S. Pat. No., 3,460,649, in which the support arms are pivotally mounted to the platform in such a manner that they may be easily pivoted to an operative position or an inoperative, collapsed position, without the removal or adjustment of connecting parts.

SUMMARY OF THE INVENTION

It is therefore an object of this invention to provide a tree stand of the type disclosed in the Baker et al U.S. Pat. No. 3,460,649, which is readily collapsible and made compact for backpacking, or transporting on the back of the hunter or other persons using the tree stand.

Another object of this invention is to provide a tree stand of the Baker type in which the inclined support arms are pivotally mounted on opposite sides of the platform in such a manner that they may pivotally move in opposed vertical planes between stable operative positions for supporting the tree stand upon a tree trunk, and an inoperative position in which not only the support arms, but the parts connecting the support arms to the platform, all lie substantially co-linearly with the side edges of the platform.

It is another object of this invention to provide a tree stand of the Baker type not only in which the support arms may be freely moved between their inclined operative position and their collapsed inoperative position relative to the platform, but the platform is hingedly mounted along its longitudinal center line for folding the platform section to provide a compact load for back-packing of the tree stand.

The tree stand made in accordance with this invention also includes swivel clips carried in the opposite ends of the cross-bar or V-bar to permit adjustment of the cross bar along the inclined support arms in operative position, or to support the cross bar along one support arm for compact storage, and to facilitate transport of the tree stand in its collapsed inoperative position.

BRIEF DESCRIPTION OF THE DRAWINGS

FIG. 1 is a top front perspective view of the tree stand made in accordance with this invention, in operative position supported on a tree trunk, shown in phantom;

FIG. 2 is a bottom front perspective view of the tree stand disclosed in FIG. 1, with the support arms, shown fragmentarily, in operative position;

FIG. 3 is an enlarged fragmentary section taken along the line 3—3 of FIG. 2;

FIG. 4 is an enlarged fragmentary section taken along the line 4—4 of FIG. 1;

FIG. 5 is an enlarged side elevational view of the tree stand disclosed in FIG. 1, with the cross-bar removed, and in upside down position, with the support arm on the near side shown in phantom in its operative position, and in solid lines in an intermediate position, and with the support arm on the remote side of the platform shown in its inoperative collapsed position;

FIG. 6 is a fragmentary bottom plan view taken along the line 6—6 of FIG. 5 of the remote side of the platform;

FIG. 7 is a bottom rear perspective view, with portions shown fragmentarily, of the platform in expanded operative position, and the support arms in their collapsed inoperative positions;

FIG. 8 is an enlarged, fragmentary, perspective view of the latch means for the platform, in its unlatched position;

FIG. 9 is a perspective view of the tree stand in its folded collapsed position with the harness in position for back-packing; and FIG. 10 is an elevational view of the opposite side of the collapsed tree stand disclosed in FIG. 9, assembled for back-packing.

DESCRIPTION OF THE PREFERRED EMBODIMENTS

Referring now to the drawings in more detail, FIG. 1 discloses a tree stand 10 made in accordance with this invention including a platform member 12, a pair of opposed elongated support arms 13 and 14 and a cross-bar or V-bar 15, generally resembling the tree stand disclosed in the Baker U.S. Pat. No. 3,460,649.

The platform member 12 made in accordance with this invention includes a pair of elongated platform sections 17 and 18 substantially equal in length, width, and thickness. The sections 17 and 18 are hinged together along their adjacent opposing sides to permit the platform sections 17 and 18 to be folded upon each other when not in use.

Each platform section 17 and 18 is fabricated from a substantially rectangular board material having opposed abutting inner edges 19 and 20 substantially coterminous in length. Each section 17 and 18 also has corresponding front straight edges or ends 21 and 22 which are preferably colinear in the same vertical plane, and opposed parallel outer edge portions 23 and 24. Reinforcing the outer edge portions 23 and 24 are a pair of corresponding parallel, straight, rigid, side rails 25 and 26, disclosed in the drawings as being elongated angle bars, with one flange flush and secured to the corresponding bottom surfaces of the platform sections 17 and 18, and with the vertical flange portions being disposed generally flush with the corresponding edge portions 23 and 24.

Transverse support members 27 and 28, in the form of elongated angle bars, are secured at longitudinally spaced intervals along the bottom surfaces of the corresponding platform sections 17 and 18, in order to further reinforce each of the platform sections 17 and 18. Moreover, each of the transverse members 27 extends across the inner edges 19 and 20 to overlap a corresponding support member 28, which also extends in the opposite direction across the inner edges or joint 19 and 20. Each of the overlapping flanges of the corresponding support bars or members 27 and 28 are joined by a hinge pin 30, to permit the platform sections 17 and 18 to be folded about the axes of the hinge pins 30, as shown in FIG. 9.

The outer ends of the respective support members 27 and 28 may be fixed, such as be welding, to the corresponding side rails 25 and 26.

The lower flanges of the respective support members 27 and 28 extend in opposite directions, so that the vertical flange portions may overlap each other, as best disclosed in FIGS. 2 and 7.

In order to prevent the platform sections 17 and 18 from folding upward beyond the plane of the abutting platform sections 17 and 18, as disclosed in FIG. 1, stop members 31 are fixed to the sides of the support members 27 and 28 in the path of the inner ends of the corresponding pivoting support members 27 and 28, as best disclosed in FIGS. 2, 7 and 8. Thus, the end edges 32 of the support members 27 and 28 will abut the corresponding stop members 31 after the platform sections 17 and 18 have been pivoted or swung from a folded position (FIGS. 9 and 10) to a horizontal coplanar operative position, as disclosed in FIGS. 2, 7 and 8.

In order to lock the platform sections 17 and 18 in their operative coplanar position, registering holes 33 may be formed in the overlapping portions of the inner edge portions of the corresponding support members 27 and 28(FIG. 8), for receiving an elongated latch pin 34 which may be supported upon the support member 28 by a spring member, such as the leaf spring 35, to bias the latch pin 34 into the corresponding registering latch holes 33. Thus, when the latch pin 34 is urged by the spring member 35 into the registering latch holes 33, the platform sections 17 and 18 will be locked in their coplanar operative position, as disclosed in FIGS. 1, 2, 5, 7 and 8.

The rear edge portions 37 and 38 of the respective platform sections 17 and 18 are generally substantially colinear, but have their inner portions cut or shaped diagonally inward to form a V-shaped notch 39 to better fit about the circumferential surface of a tree 40, as best disclosed in FIG. 1. Each of the notched surfaces may also be provided with corresponding cleats 41 and 42, if desired, for the purpose of effecting a better grip upon the circumferential surface of the tree 40.

Each of the support arms 13 and 14 is preferably substantially longer than the platform member 12, and is straight and rigid. In the drawings, the support arms 13 and 14 are disclosed as elongated channel-shaped bars.

In accordance with this invention, the front end portions of each of the support arms 13 and 14 are journaled by transverse pivot pins 43 to the free end portions of corresponding mounting bars 45 and 46. The opposite or pivoted end portions of the mounting bars 45 and 46 are pivotally journaled by pins 47, to the front portions of the corresponding side rails 25 and 26 (FIGS. 1 and 2).

As disclosed in the drawings, the lengths of the pivot mounting bars 45 and 46 are relatively short compared with the lengths of the corresponding support arms 13 and 14.

Pivotally connected to the intermediate portion of each of the support arms 13 and 14 by a corresponding pivot pin 48 in the upper end of a corresponding strut 49 and 50. The lower end of each of the struts 49 and 50 is pivotally connected by a pivot pin 51 to the rear end portion of the corresponding side rail 25 and 26.

The relative lengths of the support arms 13 and 14, the pivot mounting bars 45 and 46, and the struts 49 and 50, are such that, when the support arms 13 and 14 are in their rearward inclined operative positions, as disclosed in FIG. 1 for supporting the platform member 12 in a substantially horizontal position relative to the vertical axis of a tree 40, the struts 49 and 50 will be disposed substantially vertically, that is normal to the plane of the platform member 12 in its operative position, and the pivot mounting bars 45 and 46 will lie substantially parallel or colinearly with the corresponding side rails 25 and 26, also as best disclosed in FIG. 1. The operative position of the support arm 14 is also disclosed in phantom in FIG. 5, while an intermediate swinging position of the support arm 14 is disclosed in solid lines in FIG. 5. Moreover, the opposite support arm 13 is shown in its operative, collapsed or colinear position in solid lines in FIG. 5. The inoperative collapsed positions of th support arms 13 and 14 and their corresponding pivot mounting bars 45 and 46 and struts 49 and 50 are also shown in FIG. 7.

The cross bar 15 may be adjustably connected across the rear end portions of the corresponding support arms 13 and 14 behind the tree 40, when the platform member 12 and the support arms 13 and 14, erected in their operative positions as disclosed in FIG. 1, are fitted against the front surface of the tree 40. Channel-shaped swivel brackets 53 and 54 are journalled by swivel pins 52 to each end of the cross bar 15. The opposed flanges of the channel-shaped swivel bracket 53 and 54 are provided with transversely aligned registering holes which are also adapted to register with opposed holes 56 formed transversely through the rear end portions of the support arms 13 and 14. Thus, when the swivel brackets 53 and 54 are fitted upward around the rear end portions of the corresponding support arms 13 and 14, a locking pin 57 is inserted through the corresponding registering holes to connect the support arms 13 and 14 to the swivel brackets 53 and 54 and consequently to the cross bar 15. The locking pins 57 may be held in position by the cotter keys 58, if desired.

It will be noted that before cross bar 15 can be connected to the corresponding rear end portions of the support arms 13 and 14, the swivel brackets 53 and 54 must be set parallel to each other to receive the corresponding parallel support arms 13 and 14, as best disclosed in FIG. 1.

On the other hand, when it is desired to disassemble the tree stand 10, after the locking pins 57 have been removed from the swivel brackets 53 and 54, the swivel brackets 53 and 54 may be rotated 90° so that their channels are in alignment with each other. Then, both of the swivel brackets 53 and 54 in their aligned position, may be fitted over a single support arm, such as the support arm 13, as disclosed in FIGS. 9 and 10. The locking pins 57 are re-inserted and held by the cotter keys 58 in order to hold the cross bar 15 in a stored position, as illustrated in FIG. 10.

If desired, transverse flexible foot straps 59 and 60 may be secured to the top surfaces of platform sections 17 and 18, as best illustrated in FIG. 1.

Also attached to the rear portion of the top surface of the right platform section 18 are a pair of connecting rings 61 and 62 to which may be attached the shoulder harness straps 63 and 64 illustrated in FIG. 9 by snaffle hooks 65, if desired. Accordingly, when the tree stand 10 is folded into its compact position, the entire assembly may be borne on the back of the hunter by the shoulder straps 63 and 64. The lower ends of the shoulder straps 63 and 64 may be connected by corresponding snaffle hooks 66 to a single connecting ring 67, as disclosed in FIG. 2.

In order to prevent the support arms 13 and 14 from being folded beyond the plane of the platform member 12 in their inoperative positions, a hook-shaped keeper 69, secured to the corresponding side rails 25 and 26, projects laterally outward and extends upward to receive the corresponding strut 49 and 50 and the inner flange of the channel bar of the corresponding support arms 13 and 14, as disclosed in FIGS. 1, 2 and 7.

Also, as best disclosed in FIGS. 2, 3 and 7, a retainer clip 70 is fixed to the lower edge portion of each pivot mounting bar 45 and 46 to project upward on the inside of the mounting bar 45 and 46 in operative position, so that when each mounting bar 45 and 46 swings from its inoperative position upward to its operative position, the clip 70 will receive the flange of the corresponding side rail 25 and 26 to prevent further upward movement of the pivot mounting bar 45 and 46 and therefore the support arms 13 and 14.

In the operation of the tree stand 10, normally the tree stand 10 is in its inoperative position disclosed in FIGS. 9 and 10 folded and collapsed for storage or transportation. After the hunter or operator of the tree stand 10 reaches his destination and is preparing to climb a tree 40, the cross bar 15 is disassembled and separated from the support arm 30 by removing the locking pins 57 to disconnect the swivel brackets 53 and 54 from the support arm 13. The swivel brackets 53 and 54 are then rotated 90° so that they are parallel to each other.

The shoulder straps 63 and 64 are disconnected and stowed so that they do not interfere with the use of the tree stand 12. The platform sections 17 and 18 are then swung about the hinge pins 30 outward until they have attained their operative coplanar position as disclosed in FIGS. 1, 2, 5 and 7. The latch pin 34 is then inserted into the corresponding latch holes 33 to hold the platform sections 17 and 18 in their operative coplanar position.

Each of the support arms 13 and 14 is then swung from their inoperative positions colinear with the corresponding side rails 25 and 26, to their operative inclined positions of FIG. 1. During the swinging movement each of the pivot mounting bars 45 and 46 rotates in an arc about their corresponding pivot pins 47 from an extreme forward projecting position (FIG. 7) 180° until they are in their rearward projecting positions overlapping the corresponding side rails 25 and 26 with their corresponding clips 70 engaging the flnages of the corresponding side rails 25 and 26, as disclosed in FIGS. 1, 2, and 5. As the corresponding support arms 13 and 14 are swung by the movement of the pivot mounting bars 45 and 46 to their rearward inclined positions, the corresponding struts 49 and 50 also swing through an arc of 90° from a colinear position against the corresponding side rails 25 and 26 upward to an upright vertical position, as disclosed in FIGS. 1, 2 and the phantom position of FIG. 5.

The rear notched edge 39 of the platform member 12 is then fitted against the circumferential surface of the tree 40 to be climbed, with both rearward inclined support arms 13 and 14 extending along opposite sides of, and straddling, the tree 40 and the platform member 12 extending horizontally. With the swivel brackets 53 and 54 now parallel to each other, the cross arm 15 is placed behind the tree 40 and the open channels of the swivel brackets 53 and 54 are fitted about the rear end portions of the corresponding support arms 13 and 14 until the corresponding holes 56 are in registry with the swivel bracket holes, and the locking pins 57 are inserted and secured by the cotter keys or clips 58.

The operator may then stand upon the platform member 12 inserting his feet into the foot straps 59 and 60. Then the tree stand 10 may be operated as a climbing platform in the same manner as the platform disclosed in the prior Baker et al U.S. Pat. No. 3,460,649.

After the operator or hunter is through using the tree stand 10, the reverse steps are then carried out to disassemble the cross bar 15 and collapse the support arms 13 and 14 and fold the platform sections 17 and 18 against each other. The cross bar 15 is then installed in its stored position against the platform section 17, as disclosed in FIG. 10, and the harness shoulder straps 63 and 64 connected to the respective rings 61, 62 and 67, at which time the collapsed tree stand 20 is then in condition for back-packing or storage in a minimum of space.

It will be noted that in the assembly and disassembly of the tree stand 10 made in accordance with this invention, the support arms 13 and 14 are never disconnected from the platform member 12, but merely swung in the paths indicated by FIG. 5 to be moved between their operative and inoperative positions.

What is claimed is:
1. A tree stand comprising:
(a) a platform having a rear edge for engaging a tree trunk, a front edge, a pair of opposed straight, parallel side edge portions, and top and bottom surfaces,
(b) a pair of opposed elongated support arms, each arm having a front and rear end portion and an intermediate portion,
(c) a pair of struts, each strut having upper and lower ends,
(d) first means pivotally connecting each of the upper ends of said struts to an intermediate portion of a corresponding support arm,
(e) second means pivotally connecting each of the lower ends of said struts to a rear portion of the corresponding side edge portion of said platform,
(f) pivotal mounting means for mounting the front end portions of both said support arms for swinging movement in planes normal to said platform and parallel to said side edge portions, whereby said support arms may be moved between an operative position inclined upward and rearward from said platform and extending rearward behind said rear edge, and a collapsed position in which said support arms lie substantially colinearly of said corresponding opposite side edge portions, (g) a cross bar having opposite end portions and adapted to engage a tree trunk, (h) connector means for adjustably connecting the opposite end portions of said cross bar to said pair of support arms, to position said cross bar against and behind a tree trunk straddled by said support arms and engaged by said rear edge of said platform.

2. The invention according to claim 1 in which said pivotal mounting means is operatively connected to the front end portion of each of said support arms to position said support arms in said inclined operative position in which each of said struts is in an upright position, and to position said support arms in an inoperative position in which said struts extend colinearly of said corresponding support arms.

3. The invention according to claim 2 in which said pivotal mounting means comprises a pair of pivot mounting bars each mounting bar being pivotally connected at a pivot point to a corresponding side edge portion, each of said pivot mounting bars having a free end pivotally connected to the front end portion of a corresponding support arm, whereby each of said corresponding support arms moves arcuately about said pivot point between said corresponding operative and inoperative positions.

4. The invention according to claim 2 in which each of said struts is substantially normal to the plane of said platform in said operative position.

5. The invention according to claim 2 further comprising first stop means on each of said side edge portions for limiting the downward movement of said corresponding support arm to its inoperative position.

6. The invention according to claim 4 further comprising stop means cooperating with said pivot mounting bar to limit the upward movement of said pivot mounting bar to said operative position.

7. The invention according to claim 6 in which said side edge portions comprise elongated, straight side frame bars and said stop means comprises a stop clip fixed to each of said pivot mounting bars for engagement with said corresponding side frame bar to limit the upward movement of said pivot mounting bars.

8. The invention according to claim 1 in which said platform comprises a pair of adjacent platform sections separated front-to-rear along the middle of said platform, hing means connecting said platform sections to permit said platform sections to fold from an operative coplanar position to an inoperative position in which the bottom surfaces of said platform sections oppose each other.

9. The invention according to claim 8 further comprising stop means to limit the upper movement of said adjacent portions of said platform sections to said operative coplanar position.

10. The invention according to claim 9 further comprising latch means for locking said platform sections in said operative coplanar position.

11. The invention according to claim 10 further comprising a foot strap secured to the top surface of each of said platform sections to secure the feet of a person standing on said platform in said operative postion.

12. The invention according to claim 8 further comprising harness means attached to one of said platform sections for securing said tree stand in an inoperative collapsed position, with said platform sections folded and said support arms collapsed, upon the back of a person carrying said tree stand.

13. The invention according to claim 1 in which said connector means for the opposite ends of said cross bar comprises a pair of brackets, each bracket adapted to receive the rear portion of a corresponding support arm, means journaling each of said brackets to the opposite end portion of said cross bar for swivel movement about parallel axes perpendicular to the plane of said cross bar, and means for adjustably securing each of said brackets to a rear portion of a corresponding support arm in an operative position, said bracket being adapted to be swivelled 90° so that they are axially aligned for engagement with the same support arm for securing said cross bar to said same support arm in an inoperative position.

14. The invention according to claim 1 in which said first and second pivotal connecting means and said pivot mounting means are located on the side edge portions of said platform so that the front end portions and the rear end portions of said support arms project beyond the corresponding front and rear edges of said platform substantially equally, in said inoperative collapsed position.

* * * * *